United States Patent [19]
Kato et al.

[11] Patent Number: 5,031,169
[45] Date of Patent: Jul. 9, 1991

[54] RECORDING DISC PLAYER FOR DISCS OF DIFFERENT DIAMETER

[75] Inventors: Kazunari Kato; Hiroshi Abe, both of Iwaki, Japan

[73] Assignee: Alpine Electronics Inc., Tokyo, Japan

[21] Appl. No.: 343,466

[22] Filed: Apr. 25, 1989

[30] Foreign Application Priority Data

| Apr. 30, 1988 | [JP] | Japan | 63-108097 |
| Aug. 1, 1988 | [JP] | Japan | 63-192957 |
| Aug. 12, 1988 | [JP] | Japan | 63-201205 |

[51] Int. Cl.⁵ .............................................. G11B 3/58
[52] U.S. Cl. .................................. 369/75.2; 369/77.1; 369/233; 369/270; 369/271
[58] Field of Search ............... 369/75.2, 77.1, 231, 369/233, 236, 270, 271

[56] References Cited

U.S. PATENT DOCUMENTS

| 4,098,510 | 7/1978 | Suzuki et al. | 369/75.2 |
| 4,498,162 | 2/1985 | Schatteman | 369/77.1 |
| 4,507,768 | 3/1985 | Ikedo et al. | 369/77.1 |
| 4,539,670 | 9/1985 | Inaba et al. | 369/77.1 |
| 4,592,039 | 5/1986 | Toyoguchi et al. | 369/77.1 X |
| 4,695,995 | 9/1987 | Koizumi | 369/75.2 |

FOREIGN PATENT DOCUMENTS

| 0130260 | 8/1982 | Japan | 369/270 |
| 0214469 | 10/1985 | Japan | 369/77.1 |
| 0298757 | 12/1988 | Japan | 369/270 |
| 615991 | 4/1946 | United Kingdom . | |
| 615993 | 4/1946 | United Kingdom . | |
| 946321 | 1/1961 | United Kingdom . | |
| 954914 | 1/1961 | United Kingdom . | |
| 2069745A | 2/1981 | United Kingdom . | |
| 2141862A | 2/1981 | United Kingdom . | |
| 2135811A | 1/1984 | United Kingdom . | |

*Primary Examiner*—Benjamin R. Fuller
*Assistant Examiner*—Randy W. Gibson
*Attorney, Agent, or Firm*—Guy W. Shoup; Thomas S. MacDonald

[57] ABSTRACT

A disc player is provided that has disposed in it an insertion opening through which discs having different diameters can be inserted. A disc driving mechanism, including a turntable, is located behind the insertion opening, and there is disposed a slideably mounted stopping means in the disc insertion path behind the turntable for guiding into position over the turntable a disc of either small or large diameter.

11 Claims, 10 Drawing Sheets

RECORDING DISC PLAYER FOR DISCS OF DIFFERENT DIAMETER

FIELD OF THE INVENTION

This invention relates to a disc player such as a compact disc (CD) player, a video disc player, etc. and, in particular, to a disc player capable of reproducing the information on discs of different diameters.

BACKGROUND OF THE INVENTION

Heretofore, compact discs having a relatively large standard diameter (e.g., 12 cm), in which a number of pieces of music are recorded, have been generally used. However, recently, as CD players are becoming more and more popular, discs having a standard diameter which is smaller than that described above (e.g., 8 cm), in which 2 or 3 pieces of music are recorded, are more widely used. Therefore, it is desirable that a CD player be capable of playing discs having a large diameter and discs having a small diameter.

Heretofore, to play discs having different diameters on a disc player having a single disc insertion opening, an adapter 1 as shown in FIG. 10 is used. In this adapter 1, a base circular plate 2 is formed so as to have the same diameter as that of a disc having a large diameter. Plate 2 has elastic supporting arms 3 at several positions which can be extended to be opened. A disc (S) having a small diameter is clamped at a central portion of the adapter 1 by means of clamping protrusions 4 disposed on the supporting arms 3. By inserting this adapter 1 in the CD player through the insertion opening, it is possible to securely clamp the disc (S) having the small diameter on a turntable by using the periphery of the base circular plate 2 as a reference.

In some cases, when the disc having a small diameter mounted on the adapter 1 by the conventional techniques described above is inserted in the typical CD player through the insertion opening, a cut groove portion 3a existing between the supporting arm 3 and the base circular plate 2 in the adapter 1 passes an optical detecting means for detecting the insertion of the disc in the course of the disc loading. Groove 3a is formed in order that the supporting arm 3 can be elastically extended to be opened. As the groove 3a passes the optical detecting means, an erroneous detection by the detecting means may take place and the disc loading operation is stopped, which gives rise to a problem that the disc is not loaded at a predetermined position or that it cannot be ejected.

Further, in the case where a typical user believes that a disc having the small diameter can be used without an adapter and inserts a disc having the small diameter through the insertion opening, it is not possible to eject the disc.

Furthermore, for a CD player used on a vehicle, the use of the adapter 1 indicated in FIG. 10 is relatively complicated.

OBJECT OF THE INVENTION

An object of the invention is to solve the problems described above. In particular, the object is to provide a disc player in which discs having different diameters can be inserted and accurately clamped on a turntable within the disc player housing without the use of any adapters for discs having the small diameter.

SUMMARY OF THE INVENTION

A disc player according to this invention has disposed in it an insertion opening through which discs having different diameters can be inserted. A disc driving mechanism, including a turntable, is located behind the insertion opening, and there is disposed a slideably mounted stopping means in the disc insertion path behind the turntable for guiding into position over the turntable a disc of either small or large diameter.

Further, there is disposed a disc forwarding mechanism in front of the disc driving mechanism for pulling in a disc of small or large diameter. The disc forwarding mechanism includes a driving roller having a diameter which gradually increases with increasing distance from the center of the roller. The shape of the driving roller, in conjunction with an opposing identically shaped passive counter roller, ensures that the driver roller only contacts the edge of a disc having a small or large diameter.

The main features described above act as follows.

When a disc having a small diameter is inserted through the insertion opening of the disc player, the disc having the small diameter is forwarded towards the inner part of the disc player by the driving force of the driving roller. The disc having the small diameter contacts the stopping means, which is in a locked position, and the stopping means stops the disc having the small diameter from further penetration into the disc player. The stopping means generally consists of a curved wall, which contacts the edge of the disc, connected to two arms, or levers, extending outward and toward the turntable, which guide the positioning of the small disc over the turntable. Spreading of the arms causes the stopping means to unlock from its position; however, the diameter of the small disc is such that the edge of the small disc cannot spread apart the arms due to the edge of the small disc first coming in contact with the curved wall of the stopping means. Hence, the stopper remains in a locked position for a small disc. After the disc is guided by the stopping means to be located above the turntable, the disc is clamped to the turntable, where it can be driven by the disc driving mechanism.

When a disc having a large diameter is inserted into the disc player, it is forwarded towards the inner part of the disc player by the driving force of the driving roller. When the large disc contacts the levers connected to the stopping means, the levers are pushed apart due to the large diameter of the disc and the stopping means is unlocked from its position. The edge of the large disc pushes the slideably mounted stopping means to a position further down the disc insertion path by the driving force of the driving roller until optical detectors detect that the large diameter disc has been inserted the proper amount. At this position, the disc having the large diameter is located at a predetermined position above the turntable and is clamped in position, where it can be driven by the disc driving mechanism.

In addition, even if the disc having the small diameter is inserted in the insertion opening deviated from the center point of the insertion opening, the disc is automatically guided towards the proper position by the guiding action of the levers in conjunction with the driving force of the driving roller as follows. As the driving roller rotates after disc insertion, the disc is guided by the path of least resistance to a position where it is touched by the two levers at two points on its periphery, thus, ensuring the disc is centered along the disc insertion path.

Optical detectors are used to recognize the diameter of the disc and determine whether the positioning of the disc is proper before clamping the disc to the turntable.

Upon ejection of the disc, the slideably mounted stopping means is automatically returned to its initial locked position towards the turntable.

DETAILED DESCRIPTION

Hereinbelow an embodiment of this invention will be explained, referring to FIGS. 1 to 9B.

Figure 1:
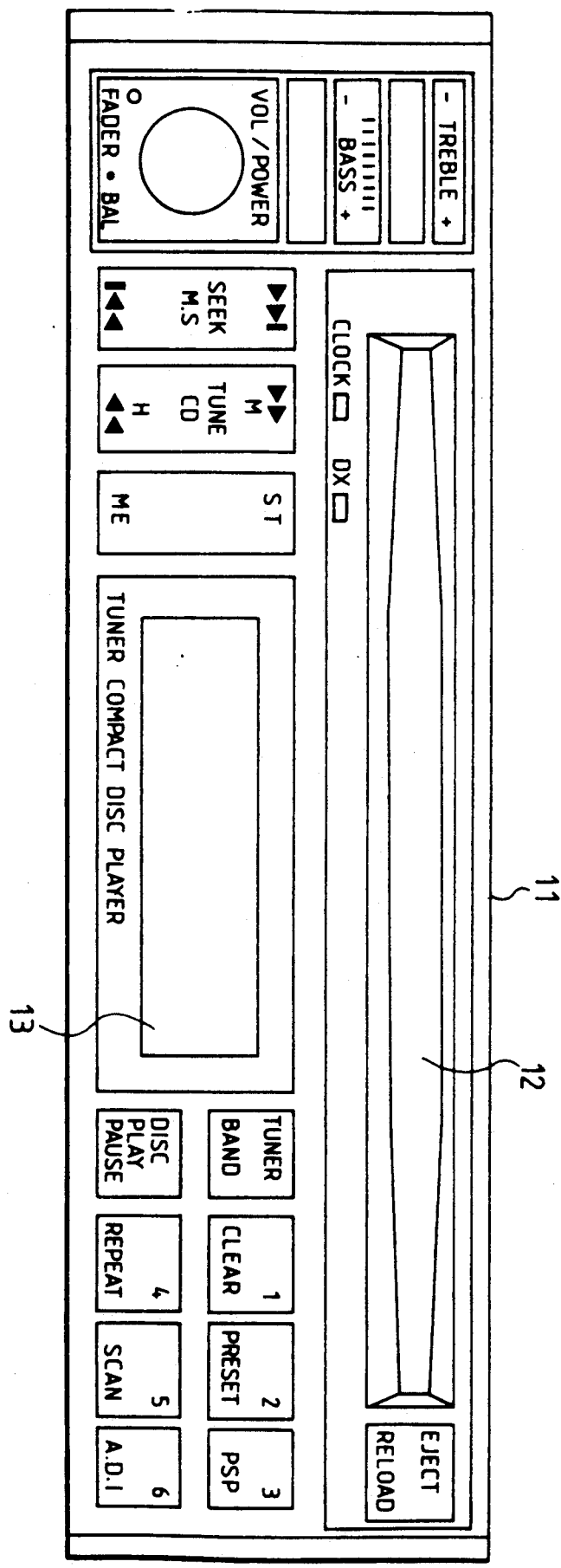
FIG. 1 is a front view of a disc player according to an embodiment of this invention.

FIG. 1 is a front view showing the front portion of a compact disc player. In this figure, reference numeral 11 represents an operation panel. On the operation panel, there is disposed a display 13 consisting of a liquid crystal display element enabling various sorts of displays. A disc insertion opening 12 is also shown, through which discs (S) having small diameters and discs (L) having large diameters are inserted. The operation panel 11 is mounted on the front of the main body (H) (see FIG. 2) of the player and is so constructed that each of the functions of the main body (H) of the player can be operated via the operational panel 11.

The main body (H) of the player will be explained in detail, referring the various figures.

Figure 2:
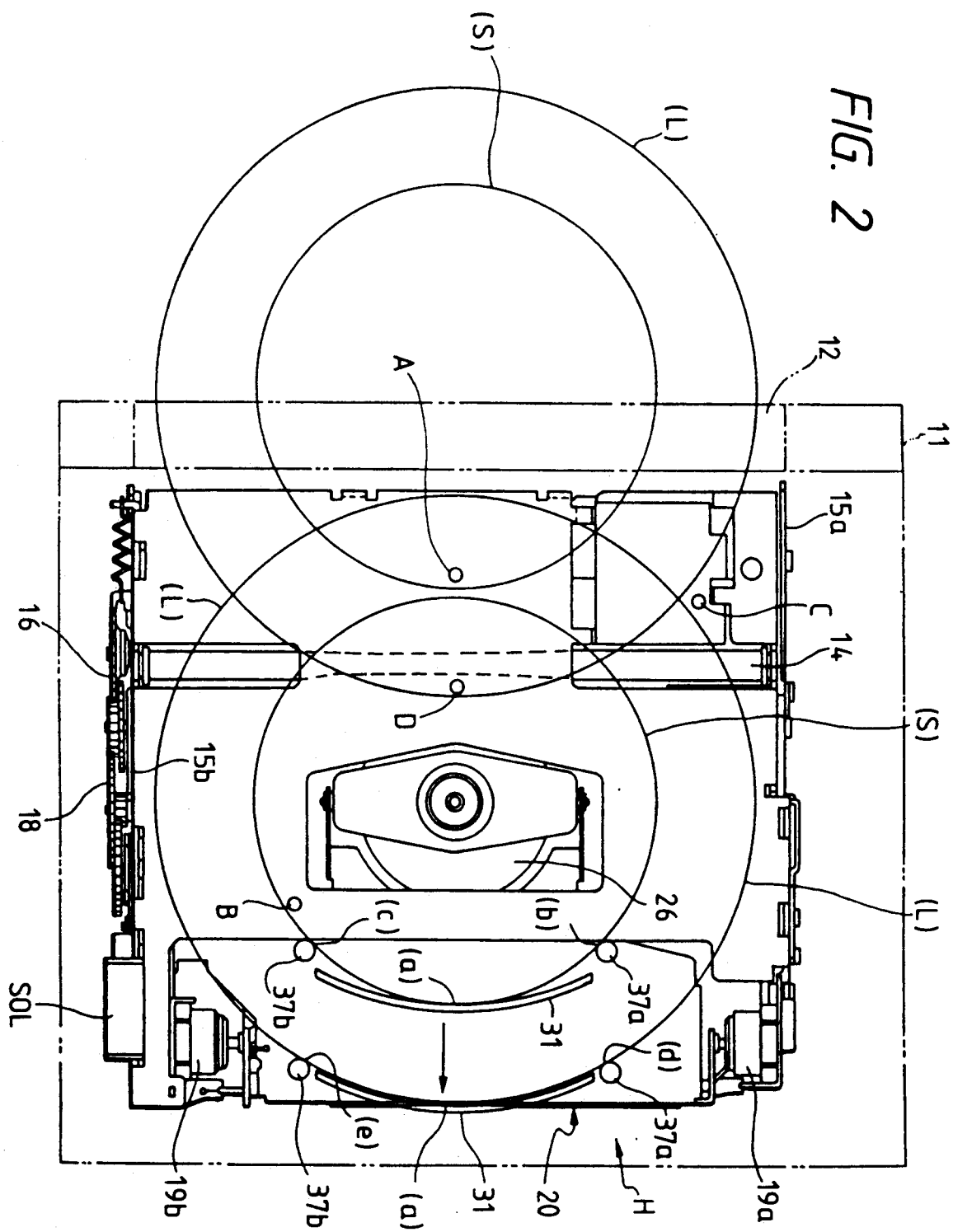
FIGS. 2 and 3 are plan views of the main body of the disc player according to an embodiment of this invention.
Figure 3:
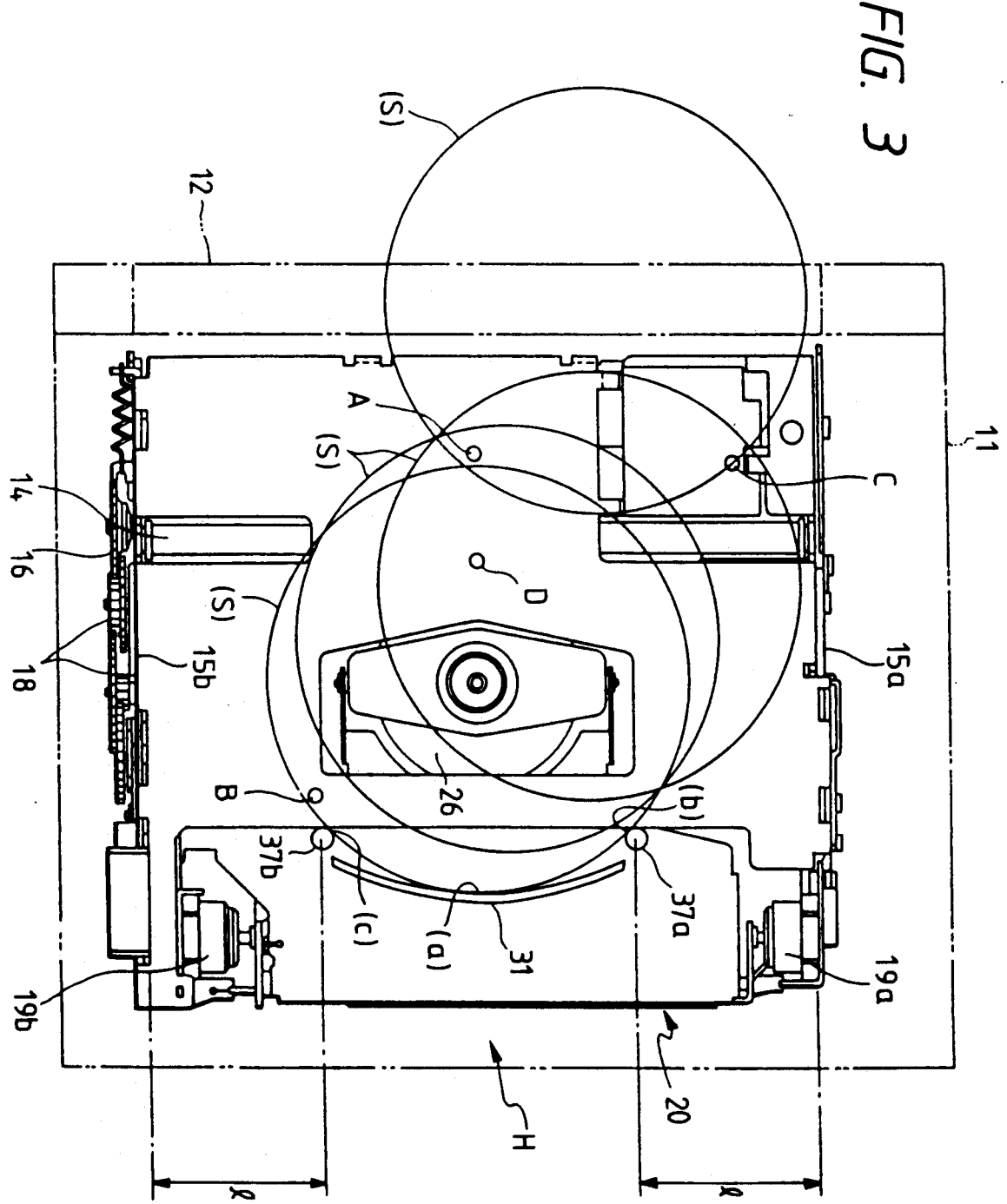
Figure 5:
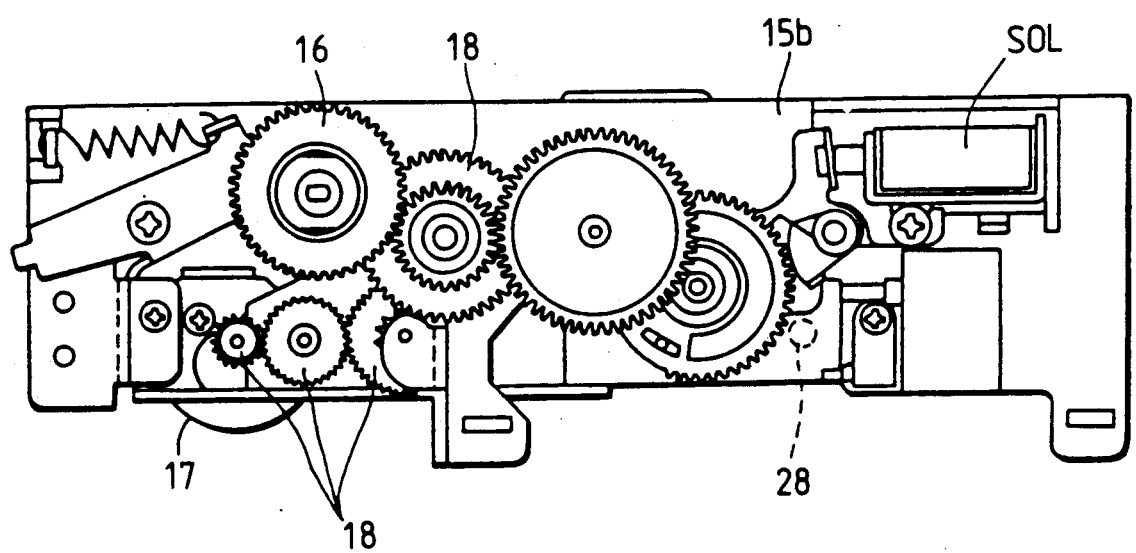
FIG. 5 is a side view of the main body of the disc player shown in FIGS. 2 and 3.

FIGS. 2 and 3 are plan views of the main body (H) of the device, and FIG. 5 is a side view thereof.

In FIGS. 2 and 3, reference numeral 14 is a driving roller, whose diameter decreases towards it center so that the center portion of a disc (L) having the large diameter, or the center portion of a disc (S) having the small diameter, is not touched by roller 14. One end of this driving roller 14 is supported rotatably by one side chassis 15a, and the other end thereof is supported rotatably by the other side chassis 15b. On the driving roller 14 is mounted a toothed wheel 16 outside of the side chassis 15b. As indicated in FIG. 5, this toothed wheel 16 is engaged with various kinds of other toothed wheels 18, 18 . . . transmitting the rotating force of a motor 17 mounted on the side chassis 15b to the driving roller 14.

Figure 7:
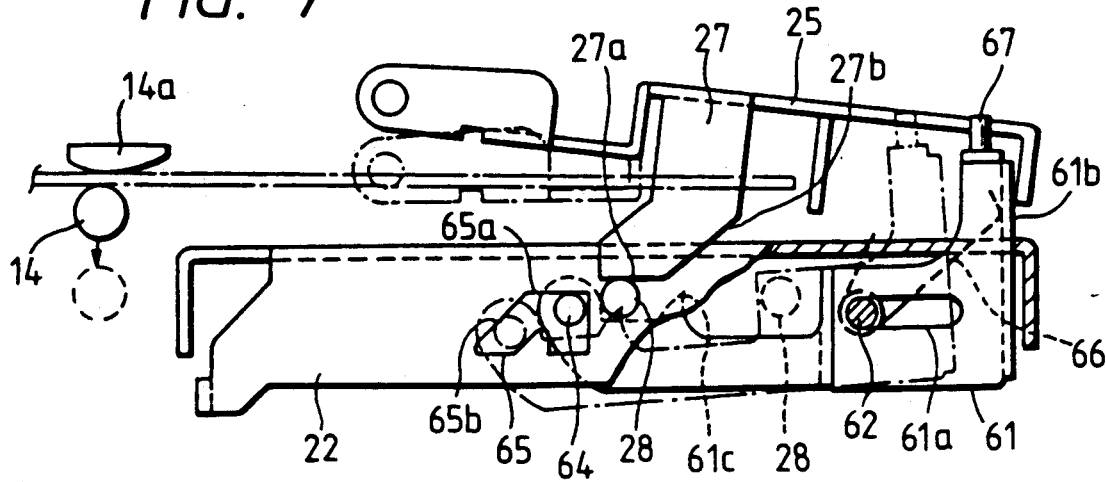
FIG. 7 is a side view of the disc driving unit shown in FIG. 6.
Figure 9A:
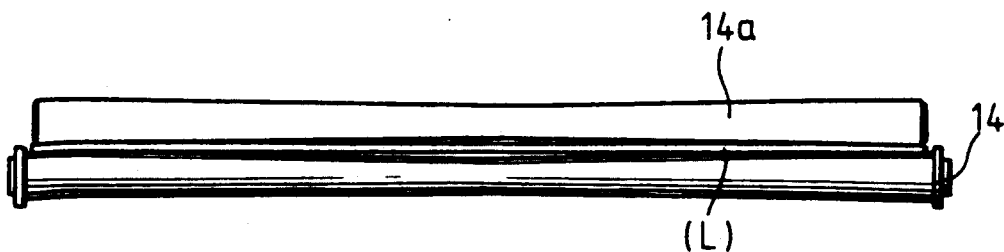
FIGS. 9A and 9B are front views showing a driving roller and a counter member which is opposite thereto.
Figure 9B:
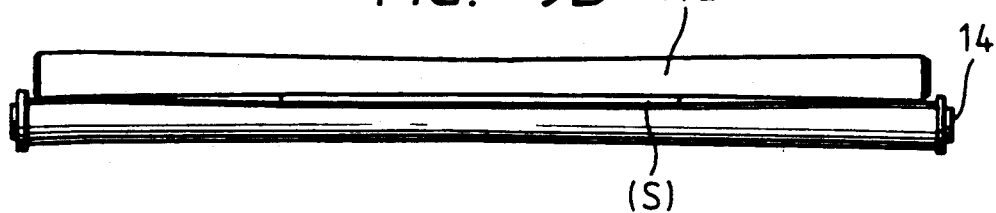
Figure 10:
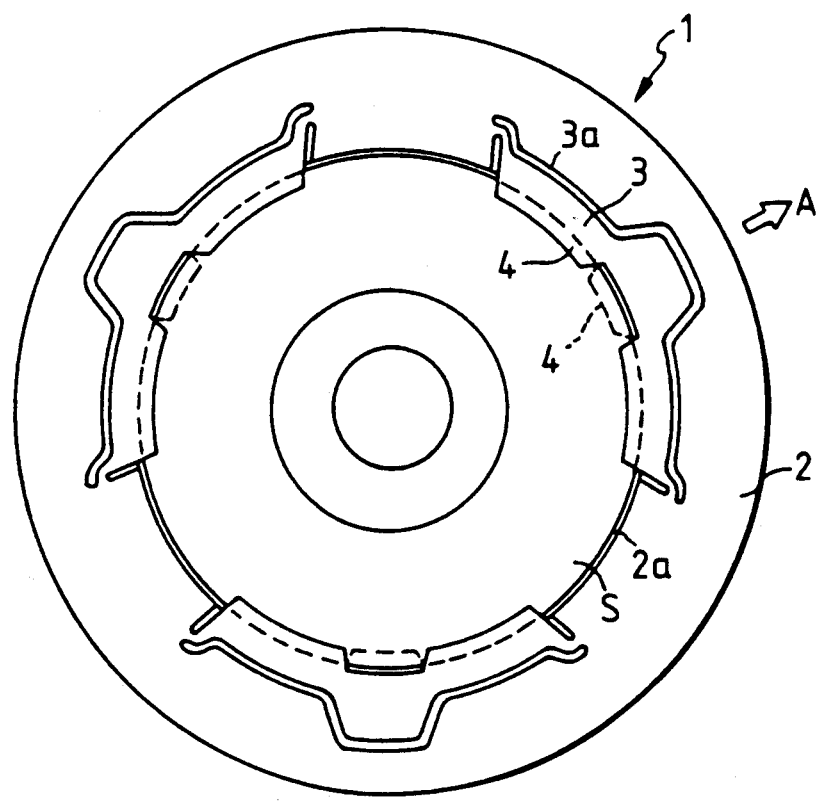
FIG. 10 is a plan view showing a prior art adapter for a disc having a small diameter which has been used heretofore.

A counter member 14a, preferably made of plastic, as indicated in FIG. 7 as well as in FIGS. 9A and 9B, is disposed so as to be opposite to the driving roller 14. The surface of this counter member 14a is a concavely curved surface. This concave shape has a curvature varying identically to the variation of the curvature of the driving roller 14, which is opposite thereto. As indicated in FIG. 7, the driving roller 14, in conjunction with the counter member 14a, holds the disc with a predetermined elastic force during the disc pulling-in operation and is retreated downward, as indicated by a broken line, after the disc has been completely inserted. The counter member 14a in the embodiment shown does not rotate, and, hence, the disc forwarded by the driving roller 14 only slides thereon. However, it is also possible to use a roller identical to driving roller 14 as this counter member 14a.

During the disc pulling-in operation, by means of the driving roller 14 and the counter member 14a, a disc (L) having the large diameter is driven by the driving roller 14 at its periphery, where the diameter thereof is largest, as indicated in FIG. 9A. For this reason, the disc (L) having the large diameter is held strongly by the elastic force of the driving roller 14 and the counter member 14a so that the disc can be pulled-in with a strong driving force.

Similarly, when a disc (S) having a small diameter is inserted, as shown in FIG. 9B, the disc (S) having the small diameter is driven at its periphery by the driving roller 14 at the more central slender portion. For this reason, the disc (S) having the small diameter is held by the driving roller 14 and the counter member 14a with a weaker force, and the disc (S) having the small is pulled-in with a force which is weaker than the driving force for driving the disc (L) having a large diameter.

Further, in the case where the disc (S) having the small diameter is inserted at a position deviated from the center line of the insertion path, and the disc (S) is pulled-in while only one end portion thereof is held by a large diameter portion of the driving roller 14, the forward progression of the disc (S) periphery due to the rotation of the large diameter portion is greater than the forward progression of the disc (S) periphery due to the rotation of the smaller center diameter portion of the driving roller 14, and the disc (S) is naturally led to the central position of the insertion driving roller 14, i.e. to the central position of the path, while being forwarded.

In FIGS. 2 and 3, reference numeral 20 indicates a disc driving unit. This disc driving unit 20 is supported 11 by four dampers 19a, 19b (the other two do not appear in the figure), which are mounted on the two side chassis 15a and 15b, for absorbing vibration. Owing to the existence of these dampers, in the case where it is used in a vehicle, the disc driving unit 20 is protected from the vibration and shock of the body of the vehicle.

Figure 4:
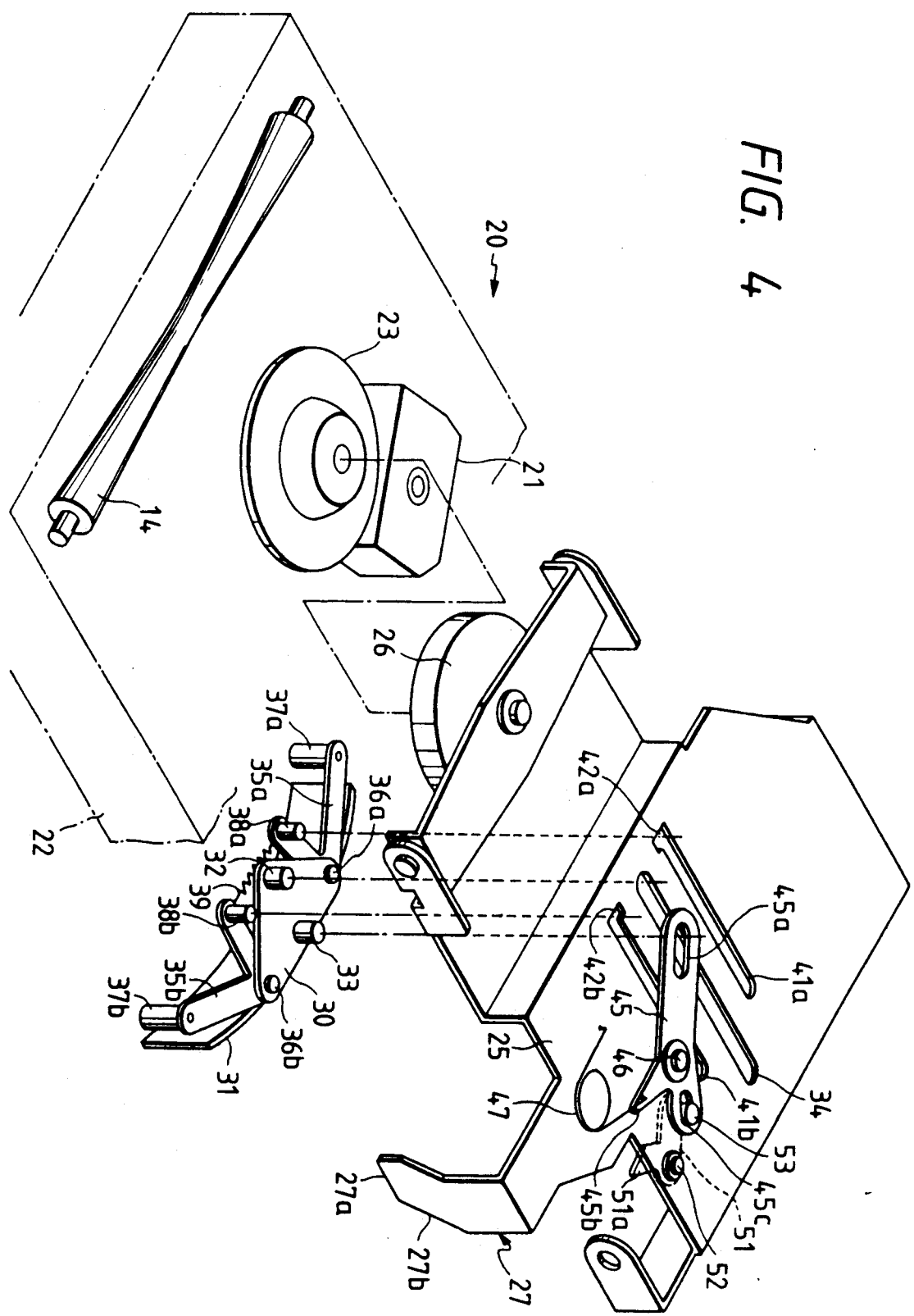
FIG. 4 is an exploded perspective view of the disc driving unit.
Figure 6:
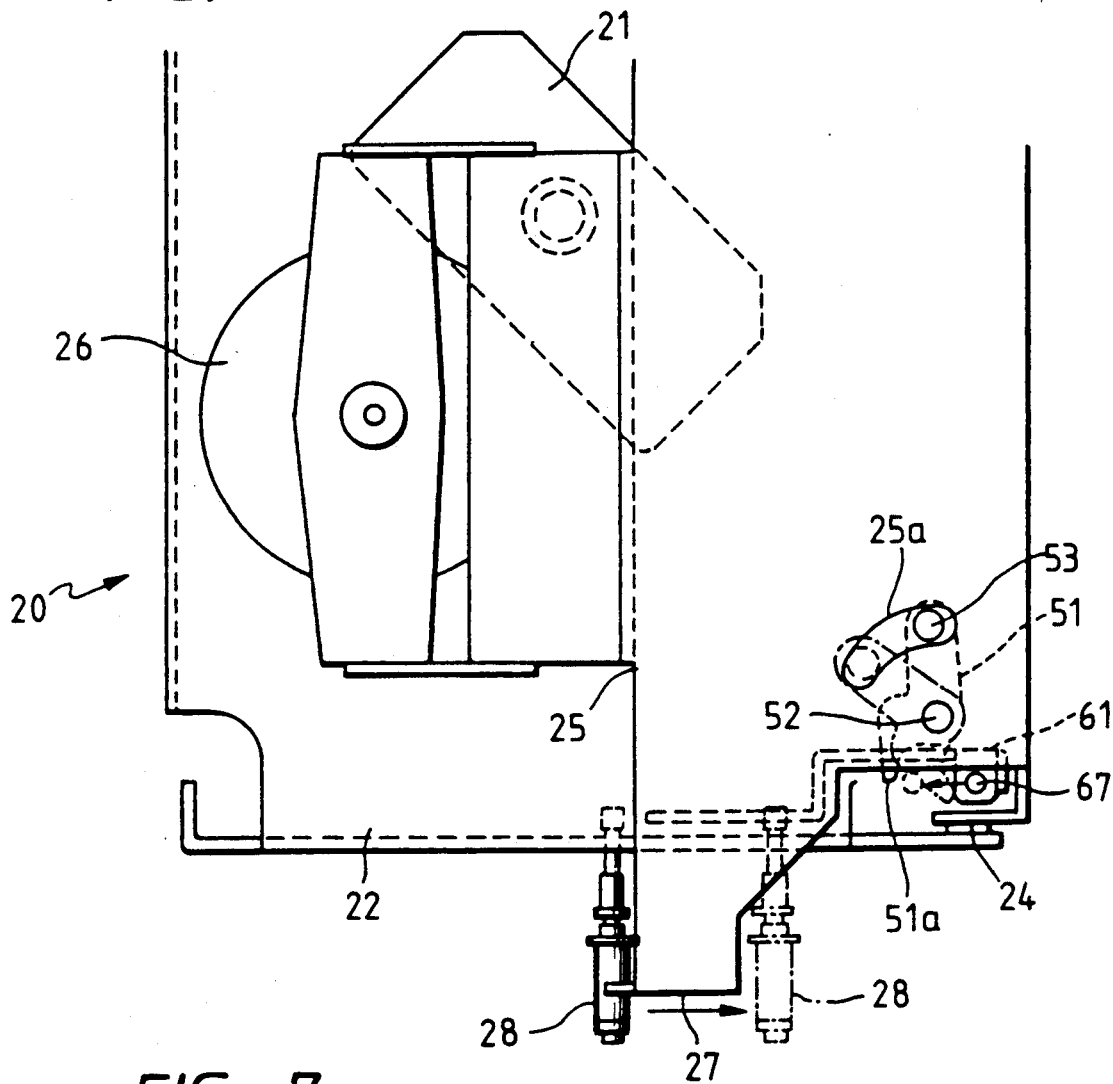
FIG. 6 is a partial plan view of the disc driving unit illustrating the construction of a return member.

As indicated in FIGS. 4 and 6, a lower chassis 22 of the disc driving unit 20 is provided with a turntable 23 for rotating the disc (S) or disc (L) and also provided with an optical pick-up mechanism 21 for reading out signals written in the disc (S) or disc (L). As indicated in FIGS. 4 and 7, on one end of the lower chassis 22 is pivotally mounted an upper chassis 25, pivotable upward and downward around a pivot 24 (refer to FIG. 6). The upper chassis 25 is urged towards the lower chassis 22 by a spring (not shown in the figure). On the upper chassis 25 is rotatably supported a clamper 26 for clamping the disc (S) or disc (L) mounted on the turntable 23. On one side of the upper chassis 25 a limiting piece 27 is formed, which controls the descent of clamper 26 onto the turntable 23. On this limiting piece 27 is formed a waiting portion 27a used when the upper chassis 25 is to be inclined upward until the disc (S) or disc (L) is supplied to the turntable 23. Also formed is an angled portion 27b adjacent to this waiting portion 27a.

When a disc (S) or disc (L) clamped to the turntable 23 is ejected, a release pin 28 (see FIGS. 6 and 7) for releasing the clamp 26 is slid with respect to this angled portion 27b and, when the release pin 28 slides below the waiting portion 27a, it raises the upper chassis 25 to unclamp the disc. This release pin 28 is driven to the left or the right in FIGS. 5, 6, and 7 by a rack mechanism, which is engaged with either one of various sorts of toothed wheels 18, 18 . . . disposed on the side chassis 15b.

When the disc is to be ejected, at first the release pin 28 is moved towards the left in FIGS. 5, 6, and 7. When the release pin 28 is located at a position indicated by the solid outline of pin 28 in FIGS. 6 and 7, the release pin 28 is engaged with the waiting portion 27a of the limiting piece 27 stated above, and in this way the upper chassis 27 is raised so that the clamp 26 is released. Power is then transmitted to the driving roller 14 so that the disc is ejected.

During a disc insertion and play operation, when the motor 17 indicated in FIG. 5 has driven the driving roller 14 to where a disc is supplied to the turntable 23, a solenoid (SOL), shown in FIG. 5, is excited, and a clutch is driven to cause the release pin 28 to be driven towards the right in FIGS. 5, 6, and 7 by the rack mechanism. Transmission of the power to the driving roller 14 is cut-off at the same time.

When the release pin 28 is moved towards the right for a play operation, as indicated by the broken outline in FIGS. 6 and 7, the release pin 28 is detached from the waiting portion 27a. Thus, the upper chassis 25 is caused to descend by the force of a spring (not shown) and the disc is clamped to the turntable 23 by the clamper 26 disposed on the upper chassis 25.

Regarding a shock damping mechanism, when the release pin 28 is at the position indicated by the solid outline causing the upper chassis 25 to be raised, the driving unit 20, previously elastically supported by the dampers 19a and 19b, is locked by a locking mechanism not shown in the figure so that it is not supported elastically. When the release pin 28 is moved to the position indicated by the broken line and the disc is in a state where it is driven again, the locking mechanism stated above is released and the driving unit 20 is again supported elastically by the dampers 19a and 19b.

Figure 8A:
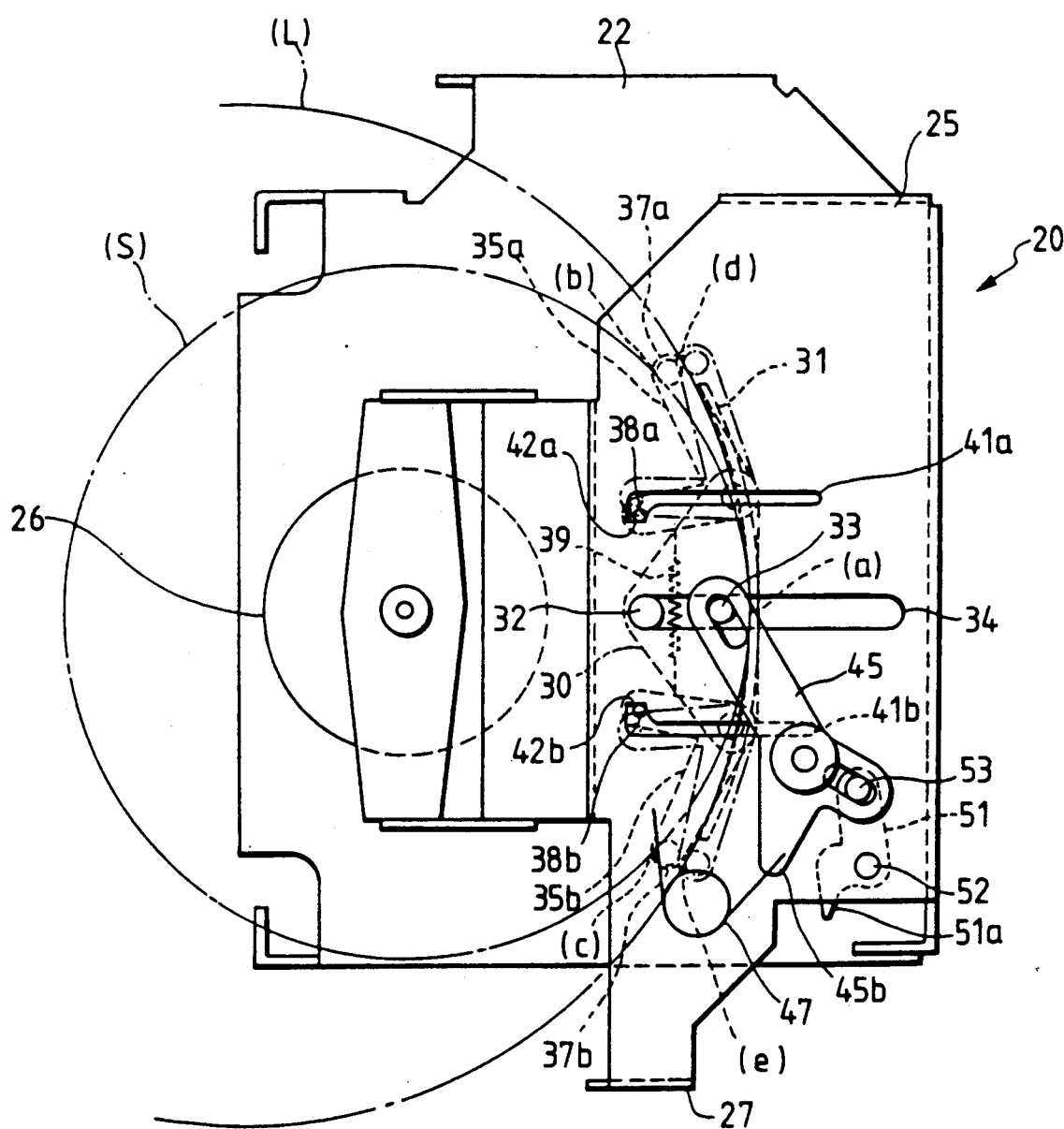
FIGS. 8A and 8B are partial plan views of the disc driving unit showing the operation of a stopping means and a lock releasing mechanism.

As indicated in FIG. 4, on the lower surface of the upper chassis 25 (surface opposite to the lower chassis 22) there is disposed a triangular slider 30 made of sheet metal. A curved wall 31 is mounted on this slider 30. As indicated in FIGS. 2 and 8A, the curved wall 31 is so formed that the surface thereof is curved with a radius of curvature equal to or slightly greater than the radius of curvature of a disc (L) having a large diameter, and the concave surface side is directed to the turntable 23. The curved wall 31 is formed so as to be curved with a curvature stated above by using a resin, etc. construction. It may be also possible to form the slider 30 and the curved wall 31 in one body made of resin, etc.

A pair of slider pins 32 and 33 are disposed on the upper surface of the triangular slider 30. Both of these pins 32 and 33 are inserted in a straight sliding hole 34 formed in the upper chassis 25 so that the slider 30 can be moved straight along this sliding hole 34.

A pair of lock release levers 35a and 35b are supported rotatably by pins 36a and 36b, respectively, on the slider 30 stated above. Each of the lock release levers 35a and 35b is composed of two arms, one being longer than the other, forming an acute angle. At the extremities of the longer arms of the lock release levers 35a and 35b there are rotatably mounted disc limiting rollers 37a and 37b, respectively, directed downward. However, each of the disc limiting rollers 37a and 37b may be composed of a member which does not rotate, such as a pin. Further, at the extremities of the shorter arms of the lock release levers 35a and 35b there are mounted lock pins 38a and 38b, respectively, directed upward.

A pair of auxiliary sliding holes 41a and 41b are formed in the upper chassis 25 stated above, locating the sliding hole 34 therebetween. This pair of auxiliary sliding holes 41a and 41b extend straight so as to be parallel to the sliding hole 34, and the lock pins 38a and 38b are inserted in the auxiliary sliding holes 41a and 41b, respectively. At the end portions of the auxiliary sliding holes 41a and 41b toward the clamper 26 are formed lock grooves 42a and 42b, respectively. These lock grooves 42a and 42b are formed in such directions that they approach each other.

The shorter arms of the pair of lock release levers 35a and 35b are linked with each other by a spring 39. The lock release levers 35a and 35b are energized by the force of this spring 39 so that the pair of lock pins 38a and 38b are urged toward each other. The energizing force of this spring is set so as to be fairly weak.

As indicated in FIG. 8A, when the slider 30 is moved towards the left in the figure, the pair of lock pins 38a and 38b, attracted to each other by the spring 39, are inserted in the lock grooves 42a and 42b at the end portions of the auxiliary sliding holes 41a and 41b, respectively. In this state, the slider 30 is locked so as to be prevented from movement towards the right of the figure, i.e. towards the inner part of the path. When the slider 30 is locked in this manner, the pair of disc limiting rollers 37a and 37b (shown in dashed outline) disposed on the lock release levers 35a and 35b, respectively, are located in the figure in a forward position to the left of curved wall 31.

As shown in FIG. 8A, when the center of the disc (S) having the small diameter is approximately centered with the turntable 23, and the lock pins 38a and 38b are locked by the lock grooves 42a and 42b, respectively, the pair of disc limiting rollers 37a and 37b are in contact with the peripheral portions (b) and (c) of the disc (S) having the small diameter. The separation angle of the disc limiting rollers 37a and 37b is such that the disc (S) having the small diameter is also simultaneously in contact with the central portion of the curved wall 31 at disc periphery point (a). The position of the disc (S) having the small diameter is guided by its contact at the three points (a), (b) and (c) so as to be positioned at the center of the turntable 23. When the disc (S) is clamped to the turntable 23, the disc (S) is slightly pulled away from the locked slider 30 by the beveling of a center raised portion of the turntable 23, thus, allowing the disc (S) to be free of any friction from slider 30.

As shown in FIG. 3, the distance l of each of the disc limiting rollers 37a and 37b from the edges of the disc insertion path indicated in FIG. 3 is set so as to be smaller than the radius of the disc (S) having the small diameter so that insertion of the disc (S) even at the edges of the disc insertion opening 12, shown in FIG. 1, will result in the disc (S) being guided over the turntable 23. Since the disc (S) cannot separate both disc limiting rollers 37a and 37b simultaneously the disc (S) cannot unlock slider 30 from its position. Thus, a disc (S) will always be guided and properly positioned at the center of turntable 23 by the contact with disc limiting rollers 37a and 37b.

When the disc (L) having the large diameter is inserted, since the radius of the disc (L) having the large diameter is greater than that of the disc (S) having the small diameter, and since the radius of curvature of the concave surface of the curved wall 31 is approximately the radius of curvature of the disc (L), when the peripheral part (a) of the disc (L) is in contact with the curved wall 31, as shown in FIG. 2, the disc limiting rollers 37a and 37b are pushed towards the right in FIG. 8A by the strong driving force of peripheral portions (d) and (e) of disc (L). As a result, the lock release levers 35a and 35b are rotated to a position where they become more distant from each other against the force of the spring 39, and the pair of lock pins 38a and 38b are separated from the lock grooves 42a and 42b formed in the upper chassis 25. Consequently, the lock of the slider 30 is released so that the slider 30 can be easily pushed towards the right in the figure.

On the upper surface of the upper chassis 25, there is disposed an eject lever 45, shown in FIGS. 4 and 8A. This eject lever 45 is supported rotatably by a supporting pin 46. An elongated hole 45a is formed at the end portion of the eject lever 45. A pin 33 secured to the slider 30 passes through sliding hole 34 formed in the upper chassis 25 and is inserted in the elongated hole 45a formed in the eject lever 45 stated above. The straight movement of the slider 30 along the sliding hole 34 is linked with the rotational movement of this eject lever 45. A return spring 47 is hooked between the base arm 45b of the eject lever 45 and the upper chassis 25. As indicated in FIG. 8A, when the slider 30 is moving left towards the insertion opening, the eject lever 45 is rotated counterclockwise by pin 33.

When the lock of the slider 30 is released and the slider 30 is moved towards the right in the figure, the force supplied by the return spring 47 is overcome, and the eject lever 45 is moved clockwise.

On the lower surface of the upper chassis 25, there is disposed an intermediate lever 51, which is supported rotatably by a supporting pin 52 on the upper chassis 25. At the extremity portion of this intermediate lever 51 there is disposed a driving pin 53, which protrudes upward, passing through an arc-shaped cut-out portion 25a (shown in FIG. 6) formed in the upper chassis 25. This driving pin 53 is inserted in an elongated hole 45c (shown in FIG. 4) formed in the eject lever 45. Further, on the intermediate lever 51 is formed a contact portion 51a, which protrudes from the side edge of the upper chassis 25.

As indicated in FIGS. 6 and 7, there is disposed a driving lever 61 on the inner surface of a side of the lower chassis 22. An elongated hole 61a is formed in this driving lever 61, and this elongated hole 61a is supported by a supporting shaft 62 secured to the inner surface of the lower chassis 22. The driving lever 61 can be freely moved towards the left and the right in FIG. 7 about supporting shaft 62 and at the same time it is rotatable around this supporting shaft 62. A limiting pin 64 is secured at the left end of the driving lever 61 in FIG. 7, and this limiting pin 64 is inserted in a limiting hole 65 formed in the lower chassis 22. The driving lever 61 can be rotated around the supporting shaft 62 as far as the limiting pin 64 is movable within the limiting hole 65.

A spring 66 is hooked on this supporting shaft 62. One end of this spring 66 is hooked on the lower chassis 22 and the other end is hooked on the inner surface of a bent portion 61b of the right side part of the driving lever 61. The driving lever 61 is moved towards the right in FIG. 7 by the energizing force of this spring 66, and the driving lever 61 is rotated clockwise by the force of this spring 66. The limiting pin 64 is thrusted on the upper edge 65a of the limiting hole 65. A driving pin 67 is secured to the right upper end of the driving lever 61 indicated in the figure, and this driving pin 67 extends to a position where it is in contact with the contact portion 51a of the intermediate lever 51 stated above and controls the movement of the contact portion 51a towards the left and the right. A protrusion 61c is formed at the upper edge of the nearly central portion of the driving lever 61. This protrusion 61c is located in a region where the release pin 28 is movable.

As indicated in FIG. 2, there are disposed optical detectors at four positions indicated by A, B, C and D within the disc insertion path. Each of these optical detectors A to D includes a light emitting element and a light receiving element, which are opposite to each other, putting the disc insertion path therebetween. Further, there is disposed a focusing member, which focuses a light beam to a predetermined diameter. Among these optical detectors A to D, the first optical detector A is used to detect disc insertion, proper positioning of a disc, and size of disc. Detector A is located at the central position of the disc insertion path inside of the insertion opening 12.

The second optical detector B is located at a position where, when the disc (S) having the smaller diameter or the disc (L) having the large diameter arrives above the turntable 23, light received by detector B is blocked by either one of the discs.

The third optical detector C is located at a position where, when the disc (L) having the large diameter or the disc (S) having the small diameter arrives above the turntable 23, light is received by detector C. The third optical detector C also has a function to detect that the disc (L) having the large diameter is ejected. When this disc (L) has been moved to a position where it does not block light to the third optical detector C, the eject operation is terminated. When the disc (S) having the small diameter, which has been once ejected to a position indicated on the left side in the figure, is pushed-in again, the fourth optical detector D detects this push-in operation by the fact that light is blocked by this disc (S). The functions of the various detectors, in conjunction with each other, determine the location of the small and large diameter discs with respect to turntable 23 and also operate to recognize the diameter of the disc. These functions will be discussed in more detail later.

The disc ejecting and loading operations in the embodiment described above will now be explained.

When an inserted disc is to be removed, the release pin 28 is moved to the left side in FIG. 7, as indicated by the full outline of release pin 28 in FIG. 7. This release pin 28 is in contact with the waiting portion 27a of the limiting piece 27 formed in the upper chassis 25, and the upper chassis 25 is thereby raised through limiting piece 27. In this way, the clamper 26 is separated from the turntable 23. Driving roller 14 in FIG. 7 is moved upward and rotated, providing a pulling force to the disc to transport the disc out of the disc player. Further, the eject lever 45 disposed on the upper surface of the upper chassis 25 is rotated counterclockwise by the return spring 47, and the slider 30, linked with the eject lever 45 through a pin 33, is pushed towards the insertion opening 12 in the case where a disc (L) is to be ejected. The pair of lock release levers 35a and 35b are attracted to each other by the spring 39. The lock pins 38a and 38b are inserted in the lock grooves 42a and 42b at the end portions of the auxiliary holes 41a and 41b formed in the upper chassis 25 and, thus, the slider 30 becomes locked. Further, the pair of disc limiting protrusions 37a and 37b are located at positions advanced towards the insertion opening 12 with respect to the curved wall 31.

When a disc (S) having the small diameter is inserted in the insertion opening 12 nearly at the center, as indicated in FIG. 2, this disc (S) is pulled into the disc player by the driving roller 14 and the counter member 14a, while being held therebetween in the position shown in FIG. 9B (small diameter portion of the driving roller 14). Owing to the concave shape of the driving roller 14 and the counter member 14a, the disc (S) is forwarded, passing through the center of the insertion path.

As indicated in FIGS. 2 and 8A, when the periphery portion (a) of the disc (S) having the small diameter is touched nearly by the central portion of the curved wall 31, the portions (b) and (c) are in contact with the disc limiting rollers 37a and 37b. The positions of rollers 37a and 37b are such that both of the rollers 37a and 37b are never pushed out simultaneously by a disc (S) having a small diameter Consequently, the lock pins 38a and 38b disposed on the lock release levers 35a and 35b are never separated simultaneously from the lock grooves 42a and 42b, respectively. Therefore, in this case, the slider 30 continues to be locked and cannot moved towards the right in FIGS. 2 and 8A. In this way, the center of the disc (S) is guided by rollers 37a and 37b to be above the center of the turntable 23.

For the disc (S) having the small diameter, it may not always be inserted in the central portion of the insertion opening 12. For example, it may be inserted where it is deviated from the center of insertion opening 12. Even in such a case, it is possible to lead the disc (S) to the central position of the path, because, since the driving roller 14 and the counter member 14a have a concave shape at the central portion as indicated in FIG. 9A, if one side edge of the disc (S) having the small diameter is held by a larger diameter portion of the driving roller 14, the forwarding distance of one side of the disc (S) periphery per rotation of the larger diameter portion of the driving roller 14 is greater than the forwarding distance of the other side of the disc (S) periphery per rotation of the smaller, more central, diameter portion and the disc (S) is automatically shifted towards the center in the course of the forwarding operation. Further, the distance 1, in FIG. 3, from the disc limiting roller 37a, which is touched at first by the edge of the disc (S) deviated from the center, to the edge of the insertion path is smaller than the radius of the disc (S) having the small diameter. In this way, when the disc is pulled in the path indicated in FIG. 3 and touched by the limiting roller 37a, the disc (S) is guided around this limiting roller 37a so that the part (a) thereof eventually comes in contact with the curved wall 31. At this point the disc is positioned above the center of the turntable 23.

As the periphery of the disc (S) is guided by the disc limiting roller 37a, the disc (S) pushes the disc limiting roller 37a to the right by the forwarding force, and the single lock pin 38a is separated from the lock groove 42a in the upper chassis 25. However, since the lock pin 38b disposed on the other lock release lever 35b is not separated from the lock groove 42b, the slider 30 remains locked in position and the curved wall 31 is never pushed towards the inner part of the path. This is the same also in the case where the disc (S) is inserted towards the side which is opposite to that indicated in FIG. 3.

When it is recognized by a detection operation, described later, that the center of the disc (S) has arrived above the turntable 23, the solenoid (SOL), shown in FIG. 5, is excited and the driving force of the motor 17 is disconnected from the driving roller 14. At the same time, the release pin 28 is driven from the position indicated by the full outline of release lever 28 in FIG. 7 towards the right to the position shown by the broken outline of release lever 28 by the driving force of the motor 17. In this way, the release pin 28 is separated by the limiting member 27, and the upper chassis 25, which has been raised by the release pin 28, is lowered by the force of a spring (not shown) so that the disc (S) is clamped by the clamper 26 to the turntable 23. Linked with this movement, the driving roller 14 descends to the position indicated by the broken line in FIG. 7.

When the disc (L) having the large diameter is inserted through the insertion opening 12 and forwarded by the driving roller 14 (refer to FIGS. 8A and 9A), the peripheral portions (d) and (e) of the disc (L) are touched almost simultaneously by the disc limiting rollers 37a and 37b, as indicated in FIG. 8A. Further, since the curved wall 31 has the concave shape corresponding approximately to the outer periphery of the disc (L), the disc (L) contacts both the limiting rollers 37a and 37b simultaneously and pushes both rollers 37a and 37b apart. By this action, the lock release levers 35a and 35b, on which these limiting rollers 37a and 37b, respectively, are disposed, are rotated against the force of the spring 39 so as to become more distant from each other, and the lock pins 38a and 38b disposed thereon, respectively, are separated simultaneously from the lock grooves 42a and 42b formed in the upper chassis 25, causing the slider 30 to be released from its locked position. Consequently, when the disc (L) is further forwarded by the driving roller 14, the curved wall 31 is pushed thereby to be moved towards the inner part of the path on the right side of FIG. 8A. In this way, the slider 30 and the curved wall 31 are moved automatically towards the right side of FIG. 8A. When the slider 30 is moved a certain distance towards the right side of FIG. 8A, the center of the disc (L) becomes aligned with the center of the turntable 23 and the disc (L) is clamped to the turntable 23. At a certain distance, the eject lever 45 rotated together with the slider 30 is further rotated clockwise by the return spring 47, thus, taking the slider 30 completely out of contact with the clamped disc (L).

When it is detected that the disc (L) having the large diameter is properly aligned with turntable 23, just as the case when the disc (S) having the small diameter is aligned, the release pin 28 is moved from the position indicated by the full outline of release pin 28 to that indicated by the broken outline in FIG. 7 so as to be separated from the limiting piece 27. By this action, upper chassis 25 descends so that the disc (L) is clamped by the clamper 26 to the turntable 23. Further, the driving roller 14 descends to the position indicated by the broken line in FIG. 7.

The operation to eject each of the discs will now be explained.

In the disc eject operation the release pin 28 is moved from the position indicated by the broken outline towards the left in FIG. 7 to arrive at the position indicated by the full outline of release pin 28. At this time, the release pin 28 is engaged with the protrusion 61c and the protrusion 61c is pulled by the release pin 28 so that the driving lever 61 is moved towards the left. The limiting pin 64 is moved from the upper edge portion 65a of the limiting hole 65 to the oblique side 65b by this movement towards the left, and the driving lever 61 is rotated counterclockwise by the oblique side 65b (indicated by the chain-dotted line in FIG. 7). In this way, the protrusion 61c is separated from the release pin 28, and the driving lever 61 is returned towards the right in the Figure by the spring 66. That is, in an eject operation, the driving lever 61 is moved once towards the left in the figure by release pin 28 and then it is returned by spring 66 towards the right. By this movement, the driving pin 67 disposed at the upper extremity of the driving lever 61 is first moved from the position indicated by the full outline to that indicated by the broken outline in FIG. 7, and then moved back again.

During the loading operation of the disc (S) having the small diameter, the slider 30 is not moved, remaining in the position indicated in FIG. 8A. Since the slider 30 is in its locked position, the contact portion 51a of the intermediate lever 51 is separated from the driving pin 67. In this way, the driving pin 67 moving together with the movement of the driving lever 61 during the eject operation described above is not contacted by this contact portion 51a.

Figure 8B:
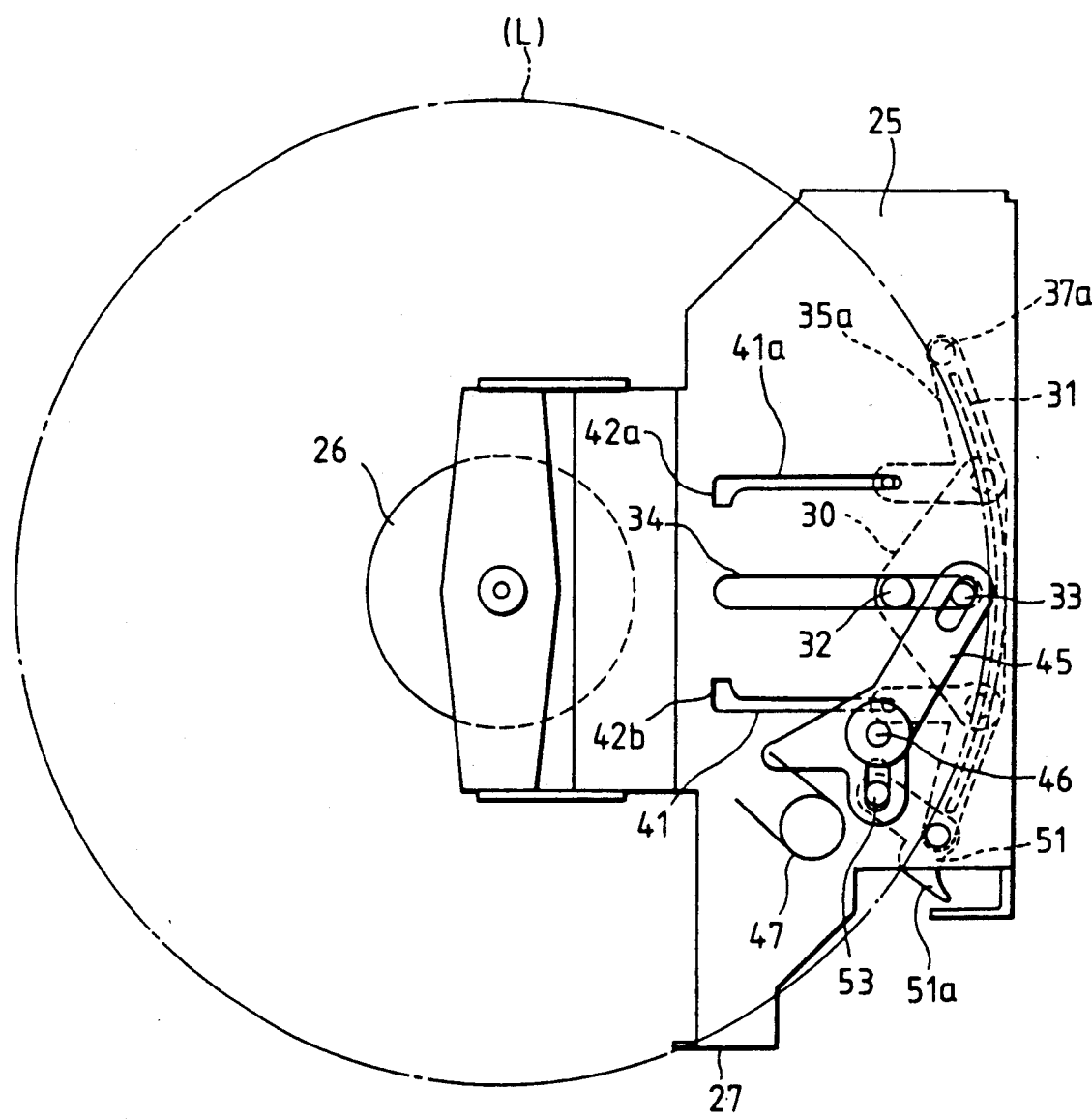

When a disc (L) having a large diameter is loaded, the slider 30 is moved towards the right in FIG. 8B, and the eject lever 45 is rotated clockwise. Consequently, the intermediate lever 51 linked with the eject lever 45 is rotated counterclockwise, and the contact portion 51a is moved towards the right. Therefore, in the eject operation of the disc (L) having the large diameter, the driving pin 67 pushes the contact portion 51a by the movement described above of the driving lever 61 towards the left and the intermediate lever 51 is driven clockwise. Together therewith, the eject lever 45 is rotated counterclockwise, and when it is rotated up to a certain angle, it is rotated further by the return spring 47 so that the slider 30 and the curved wall 31 are returned towards the insertion opening 12.

When the release pin 28 is moved towards the left in FIG. 7, the limiting piece 27 is raised thereby and the upper chassis 25 is moved upward so that the disc clamped by the clamper 26 is released. Further, the driving roller 14 indicated by the broken line in FIG. 7 is raised and the disc is held by this roller 14 and the counter member 14a so that the disc is ejected towards the insertion opening by the reverse rotation of this driving roller 14.

The detection, recognition, etc. of the inserted disc will now be explained.

As indicated in FIGS. 2 and 3, optical detectors indicated by A, B, C, and D are mounted on the disc insertion path. In the following explanation, each of the optical detectors is assumed to be turned-on when a disc blocks light to the detector, and turned-off when the disc does not block the light.

When the driving motor 17 is stopped and a disc (S) having the small diameter or a disc (L) having a large diameter is inserted through the insertion opening 12, the first optical detector A is turned-on by the disc (S) or disc (L) blocking light to detector A. In this way, the motor 17 is started and the driving roller 14 is rotated so that the disc is pulled-in.

The distinction of whether the disc has the small diameter (S) or the large diameter (L) and whether the center of the disc is above the center of the turntable is effected as follows. When the center of the disc (L) having the large diameter is positioned above the turntable 23, the second optical detector B and the first optical detector A are turned-on, and the third optical detector C is turned-off. In this case, loading is terminated at the moment when the third optical detector C is turned-off.

During insertion of a disc (S) having a small diameter, when the center of the disc (S) having the small diameter is positioned above the turntable 23, the second optical detector B is turned-on and the third and the first optical detectors C and A, respectively, are turned-off. The first and the second optical detectors A and B, respectively, are so located that they cannot be turned-on simultaneously by the disc (S) having the small diameter. Consequently, it is possible to recognize whether an inserted disc has the small diameter (S) or the large diameter (L) depending on whether the first and the second optical detectors A and B are simultaneously turned-on after a disc (S) is aligned with respect to the turntable 23.

Figure 11:
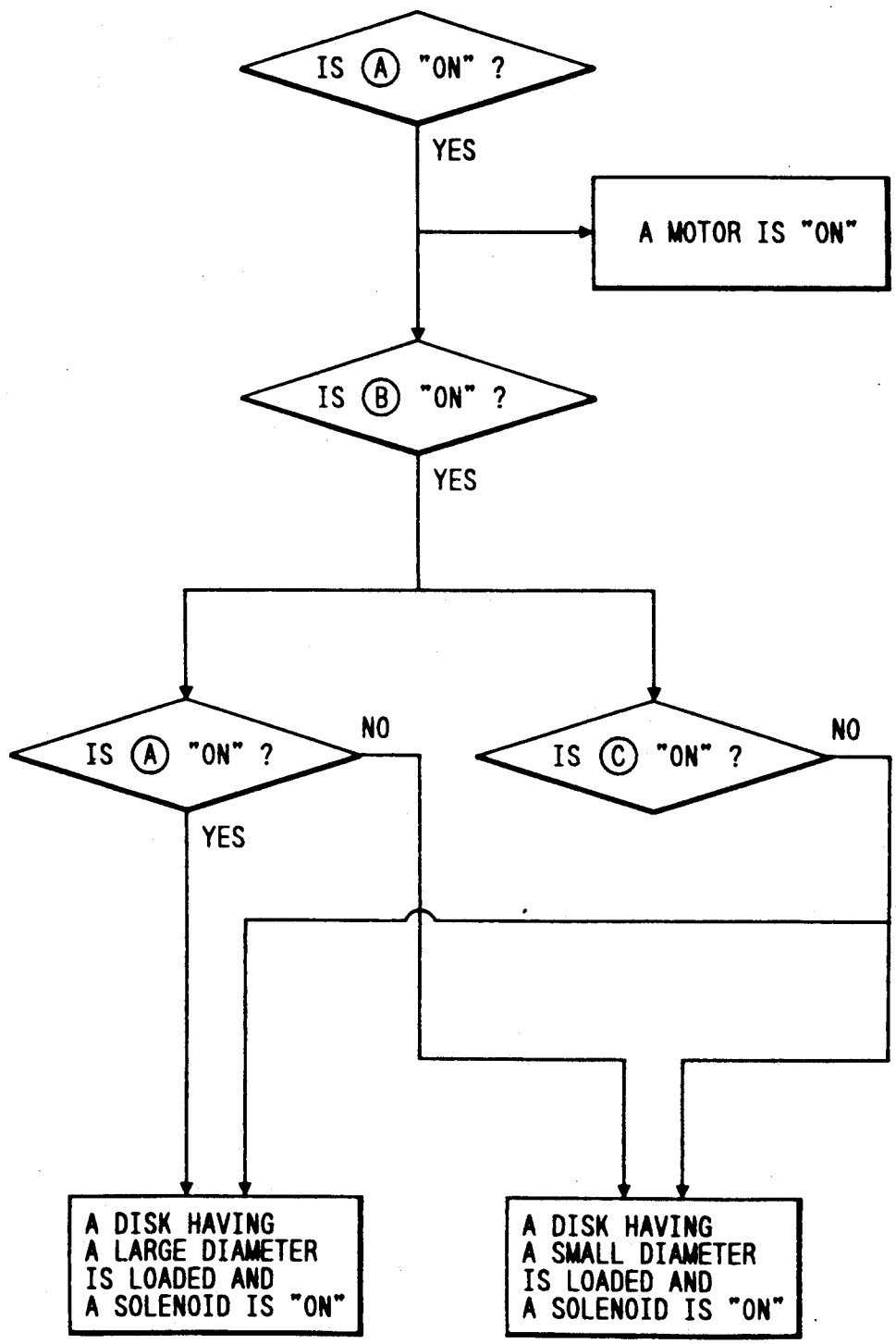
FIG. 11 is a control flowchart for the detecting means used in an embodiment of this invention.

Owing to the arrangement described above of the optical detectors, the detection of the disc loading and the recognition of the size are possible by using a flow-chart as indicated in FIG. 11. At first, where the motor 17 driving the driving roller 14 is turned-off, and when the first optical detector A is first turned-on, an instruction to start the motor 17 is issued to rotate the driving roller 14 in the forwarding direction. In the control procedure, the moment when the second optical detector B is turned-on, in order to distinguish the disc size and whether the loading operations should be terminated, the first and the third optical detectors A and C are examined and, if both of them are turned-off, it is confirmed that the loading of the disc (S) having the small diameter is completed. As a result, the solenoid (SOL) is excited, the motor 17 driving the driving roller 14 is stopped, and the procedure proceeds to the clamping operation previously described.

When the second optical detector B is turned-on, if the first and the third optical detectors A and C are simultaneously turned-on, the disc (L) having the large diameter is still being pulled-in. Consequently, if it is later confirmed that the second optical detector B remains turned-on and the third optical detector C is turned-off, it is known that the loading of the disc (L) having the large diameter is completed. The driving roller 14 is then stopped and the procedure proceeds to the clamping operation.

The eject detection of the discs is effected as follows.

For ejecting a disc (L) having a large diameter, the clamp 26 is released by the eject operation, and the driving roller 14 is rotated in the reverse direction by the motor 17 to eject the disc (L). The third optical detector C, which has been turned-off up to this moment, is turned-on once again and, when it is again turned-off, the disc (L) ejection is complete and the motor 17 is stopped. At this time, as illustrated on the left side of FIG. 2, a state is realized, where the rear end of the disc (L) is located above the driving roller 14. The disc (L) may then be manually removed.

In the ejection operation of a disc (S) having a small diameter, the motor 17 is driven for a certain period of time after the clamp 26 has been released by the eject operation to ensure the disc (S) having the small diameter is at a position separated from the driving roller 14, where the extremity of the disc (S) having the small diameter protrudes from the insertion opening 12. The disc (S) may then be manually removed.

Further, when a disc, which has been one ejected, is again pushed-in, a disc (L) having a large diameter is recognized by the fact that the third optical detector C is again turned-on and, for a disc (S) having a small diameter, by the fact that the fourth optical detector D is newly turned-on. The driving roller 14 is then driven by this confirmation.

As described above, whichever disc (S) or (L) is used, it is possible to guide the disc (S) and (L) to a centered position above the turntable 23 and execute the above described operations for both the discs (S) and discs (L). Using the embodiment described, both the discs (S) and discs (L) can be reproduced without significantly modifying a disc player used heretofore. Further, using this embodiment, since the disc (S) having the small diameter can be inserted therein at a position deviated from the center, when a driver of a vehicle inserts the disc (S) in a disc player in the vehicle it is simple for the driver to perform the insertion operation.

Although in the embodiment indicated in the drawings the curved wall 31 has a curved surface substantially identical to the outer periphery of a disc (L) having a large diameter, the curved wall 31 may be a plane wall located behind the disc limiting rollers 37a and 37b or it may be a plurality of protrusions forming a curved shape.

As described above, according to this invention, it is possible to insert discs having different diameters through a same insertion opening and to set them on a turntable in the disc driving mechanism without using any adapter.

We claim:

1. A disc player comprising:
 a housing;
 an insertion opening in said housing for inserting therethrough discs of large or small diameters;
 roller means in said housing adjacent said opening for pulling said discs into said housing;
 a disk driving mechanism located within said housing for rotating a disc having a large or small diameter once inserted into said roller means and pulled through said insertion opening and properly positioned with respect to a turntable;
 a moveable stopping means located at a first fixed position within said housing for guiding a disc having a small diameter to a position substantially centered with respect to said turntable,
 said stopping means being configured to be moved by insertion of a disc having a large diameter to a second position to allow said disc having a large diameter to be inserted farther into said housing to a position substantially centered above said turntable; and
 wherein said stopping means is configured to be locked by a locking means in said first position to guide said disc having a small diameter into said position substantially centered with respect to said turntable and unlocked from said first position by a greater force exerted by a periphery of said disc having a large diameter when inserted into said housing than the force incident to insertion of said small diameter disc, thereby enabling said stopping means to be moved by said greater force to said second position.

2. A disc player comprising:
 a housing;
 an insertion opening in said housing for inserting therethrough discs of large or small diameters;
 a disk driving mechanism located within said housing for rotating a disc having a large or small diameter once inserted through said insertion opening and properly positioned with respect to a turntable;
 a moveable stopping means located at a first position within said housing for guiding a disc having a small diameter to a position substantially centered with respect to said turntable,
 said stopping means being configured to be moved by insertion of a disc having a large diameter to a second position to allow said disc having a large diameter to be inserted farther into said housing to a position substantially centered above said turntable;
 wherein said stopping means is configured to be locked by a locking means in said first position to guide said disc having a small diameter into said position substantially centered with respect to said turntable and unlocked from said first position by a force exerted by a periphery of said disc having a large diameter when inserted into said housing, thereby enabling said stopping means to be moved by said force to said second position; and
 wherein said stopping means comprises a slideably mounted wall for preventing said disc having a small diameter from further insertion into said housing and for preventing said disc having a small diameter from unlocking said stopping means.

3. The disc player of claim 2 wherein said locking means comprises a pair of disc limiting means, each connected to a respective lever pivotally connected to said stopping means, said pair of disc limiting means being a distance apart from one another so as to be simultaneously pushed apart by contact with the periphery of said disc having a large diameter when said disc having a large diameter is being forwarded into said housing but not simultaneously pushed apart by said disc having a small diameter when said disc having a small diameter is being forwarded into said housing, said disc limiting means, when pushed apart by said disc having a large diameter, being configured to move said respective levers to disengage lock pins fixed to said levers from respective lock grooves, thereby unlocking said stopping means from said first position.

4. The disc player of claim 3 further comprising a disc forwarding mechanism for pulling into said disc player a disc of a large or small diameter after said disc of a large or small diameter has been inserted into said insertion opening, said disc forwarding mechanism comprising:
 a drive roller rotated by a motor means for frictionally providing a pulling force to a disc inserted into said insertion opening, said drive roller having a diameter which is a minimum at a center thereof and which gradually increases to a maximum diameter at ends of said roller so as to only contact said disc having a large diameter or a small diameter at the a periphery of said disc; and a counter member shaped substantially identical to said drive roller and opposing said drive roller to provide a desired opposing and frictional force between said drive roller and said disc.

5. The disc player of claim 4 wherein said pair of disc limiting means are urged toward each other with a force supplied by a resilient means, and said pair of disc limiting means are separated a distance from each other, with said wall therebetween, as to preclude said disc having a small diameter, being pulled in by said disc forwarding mechanism, from simultaneously spreading said disc limiting means apart, said disc limiting means acting to guide said disc having a small diameter into alignment with respect to said turntable when said disc having a small diameter is deviated from a center line between a center of said insertion opening and a center of said turntable.

6. The disc player of claim 5 wherein said wall is curved so as to have a radius of curvature substantially equal to a radius of curvature of said disc having a larger diameter.

7. The disc player of claim 6 wherein said stopping means is slideably mounted on a chassis and urged toward said first position by a resilient means providing a force said stopping means is unlocked and pushed toward said second position by said periphery of said disc having a large diameter.

8. A disc player comprising:
a housing;
an insertion opening in said housing for inserting therethrough discs of large or small diameters;
a disk driving mechanism located within said housing for rotating a disc having a large or small diameter once inserted through said insertion opening and properly positioned with respect to a turntable;
a drive roller located behind said insertion opening for pulling into said disc player a disc having a large or small diameter, said drive roller having a diameter which is a minimum at a center thereof and which gradually increases to a maximum diameter at ends of said roller so as to only contact said disc having a large diameter or a smaller diameter at a periphery;
a counter member shaped substantially identical to said drive roller and opposing said drive roller to provide a desired opposing and frictional force between said drive roller and said disc;
a moveable stopping means located in a first position within said housing to guide said disc having a small diameter to a position substantially centered with respect to said turntable as said drive roller forwards said disc having a small diameter into said housing, said moveable stopping means being configured to be moved to a second position by contact with a periphery of a disc having a large diameter as said drive roller forwards said disc having a large diameter farther into said housing for proper positioning of said disc having a large diameter with respect to said turntable;
wherein said stopping means is locked by a locking means in said first position to guide said disc having a small diameter into said position substantially centered with respect to said turntable and unlocked from said first position by said force exerted by said periphery of a disc having a large diameter when inserted into said housing, thereby enabling said stopping means to be moved by said force to said second position; and wherein said stopping means comprises a slideably mounted wall for preventing said disc having a small diameter from further insertion into said housing and for preventing said disc having a small diameter from unlocking said stopping means.

9. The disc player of claim 8 wherein said locking means comprises a pair of disc limiting means, each connected to a respective lever pivotally connected to said stopping means, said disc limiting means being a distance apart from one another so as to be simultaneously, pushed apart by contact with the periphery of said disc having a large diameter but not simultaneously pushed apart by said disc having a small diameter, said disc limiting means, when simultaneously pushed apart by said disc having a large 10. A disc player comprising:
a housing;
an insertion opening in said housing for inserting therethrough discs of large or small diameters;
a disk driving mechanism located within said housing for rotating a disc having a large or small diameter once inserted through said insertion opening and properly positioned with respect to a turntable;
a moveable stopping means located in a first position within said housing for guiding a disc having a small diameter to a position substantially centered with respect to said turntable,
said stopping means being moved by insertion of a disc having a large diameter to a second position to allow said disc having a large diameter to be inserted farther into said housing to a position substantially centered above said turntable;
a disc forwarding mechanism, including a drive roller, disposed within said housing between said insertion opening and said turntable for forwarding an inserted disc to centered position with respect to said turntable;
a first optical detector disposed along a center line between a center of said drive roller and a center of said insertion opening so that when a disc having a small diameter is centered with respect to said turntable, said disc having a small diameter will not block light to said first optical detector, and, when a disc having a large diameter is centered with respect to said turntable, said disc having a large diameter will block light to said first optical detector;
a second optical detector disposed within said housing at a location where light to said second optical detector is blocked by said disc having a small diameter when said disc having a small diameter is centered with respect to said turntable; and
a third optical detector disposed within said housing at a location where light to said third optical detector is blocked by said disc having a large diameter until said disc having a large diameter is substantially centered with respect to said turntable.

11. The disc player of claim 10 further comprising a fourth optical detector disposed within said housing on a center line between said drive roller and said turntable for detecting the insertion of any disc and recognizing whether a disc having a large diameter or a disc having a small diameter is being reinserted.

* * * * *